July 2, 1946.   E. K. SHOULTZ   2,403,027
COMBINATION SAW
Filed March 22, 1944   2 Sheets-Sheet 2
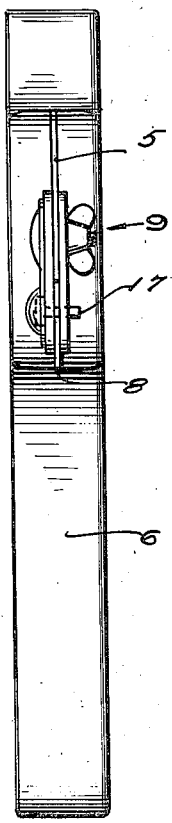
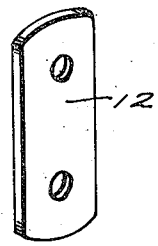
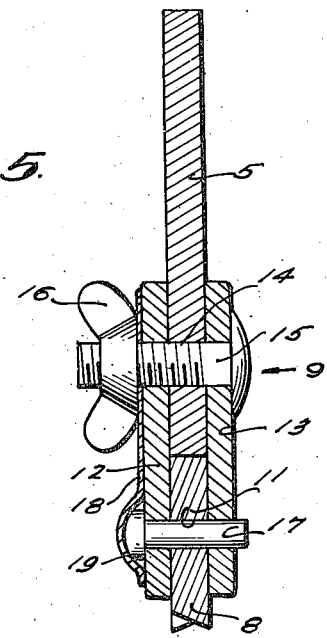
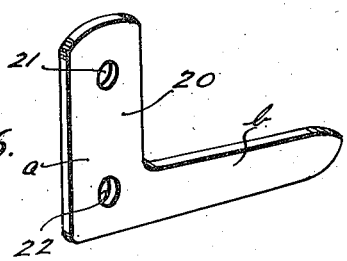
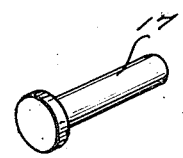
Inventor
Earl K. Shoultz
By *Clarence A. O'Brien and Harvey B. Jacobson*
Attorneys Patented July 2, 1946

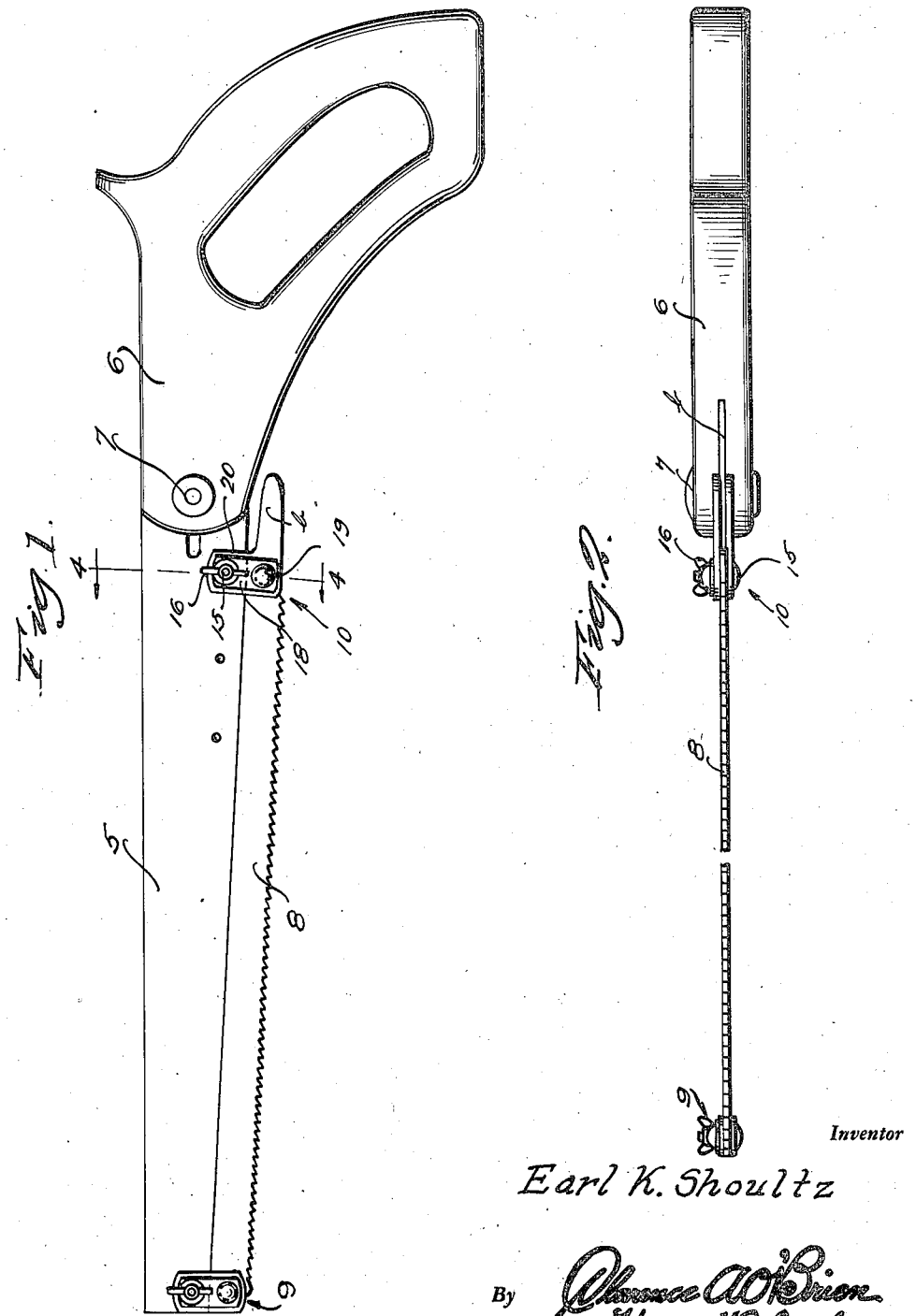

2,403,027

UNITED STATES PATENT OFFICE 2,403,027

COMBINATION SAW

Earl K. Shoultz, Los Angeles, Calif.

Application March 22, 1944, Serial No. 527,614

2 Claims. (Cl. 145—31)

This invention appertains to new and useful improvements in saws, the principal object being to provide a saw having a blade element which can be interchanged depending upon the type of cutting edge desired.

Another important object of the invention is to provide a saw structure which has a removable cutting edge which can be replaced from time to time with the type of cutting edge desired and which may be manufactured to be discarded after becoming dull as it is contemplated that the edge structure will cost no more to replace than the prevailing price for sharpening saws.

Other objects and advantages of the invention will become apparent to the reader of the following description.

In the drawings:

Figure 1 is a side elevational view of the assembled saw.

Figure 2 is an edge elevational view of the saw.

Figure 3 is an end elevational view.

Figure 4 is a section on the line 4—4 of Figure 1.

Figure 5 is a perspective view of one of the connecting plates shown in Figure 4.

Figure 6 is a perspective view of one of the tightening plates shown in Figure 1.

Figure 7 is a perspective view of one of the detent pins.

Referring to the drawings wherein like numerals designate like parts, it can be seen that numeral 5 denotes an elongated tapered saw back having a handle 6 suitably secured thereto as at 7. This saw back 5 has straight edges along the opposite longitudinal edges thereof, the underedge serving as an abutting edge for the back edge of a replaceable saw strip 8. In other words, intention is to complete the saw back 5 by the provision of a replaceable saw edge strip 8 to finally present a carpenter's saw, which instead of being sharpened from time to time need only have the blade strip 8 replaced and instead of a carpenter carrying two or three different types of saws such as rip saws, cross-cut saws, etc. he carries only one handle 6 and one saw back 5 and as many different kinds of blades 8 and replacements therefor as he needs.

The outer and inner ends of the blade strip 8 are secured by fastening means 9, 10. The outer end of the saw strip 8 has an opening 11 (Figure 4) which registers with the openings in the lower ends of a pair of connecting plates 12, 13 which extend upwardly and have openings in their upper ends to match an opening 14 in this end of the saw back 5. A bolt 15 equipped with a wing nut 16 is disposed through the last-mentioned openings, while through the first-mentioned opening a smooth headed pin 17 is disposed. A sheet metal strip 18 having an opening in its upper end is held in place by the bolt 15, this strip having a cup 19 at its lower end for disposition over the head of the pin 17 to prevent displacement of the pin 17.

As can be seen in Figure 1, the same arrangement of openings and provision of a bolt 15 and nut 17 is made, the only difference being that instead of providing the connecting plates 12, 13, bellcrank-shaped plates 20 are provided, these plates having vertical portions $a$ and laterally disposed finger engageable portions $b$. The bolt 15 of the rear fastening means 10 is disposed through the upper opening 21 (see Figure 6), while through the lower opening 22 is disposed one of the pins 17. It can now be seen, that when the pin 17 and bolt 15 have been loosely disposed in position, by pulling upwardly on the finger-engageable portions $b$ of the bellcrank-shaped plates 20, the strip saw 8 can be driven firmly against the adjacent longitudinal edge of the saw back 5, after which the wing nut 16 of the fastening unit 10 can be firmly tightened.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a device of the character described in combination, a saw back, a replaceable saw edge, connecting means between said back and edge at one end, and additional connecting means between said back and edge at the opposite end, each of said connecting means including means forming apertures in said back and edge, a pair of connecting straps having pairs of apertures therein aligned with said first-mentioned apertures, a headed pin passed through one of said pair of apertures and said saw edge, a securing strip overlying the head of said pin and having an aperture therein aligned with the other of said pair of apertures, a bolt passed through said other of said pair of apertures, said aperture in said saw back, and said aperture in said strip, and a nut for said bolt.

2. In a device of the character described in combination, a saw back, a replaceable saw edge, connecting means between said back and edge at one end, and additional connecting means between said back and edge at the opposite end, each of said connecting means including means forming apertures in said back and edge, a pair of connecting straps having pairs of apertures therein aligned with said first-mentioned apertures, a headed pin passed through one of said pair of apertures and said saw edge, a securing strip overlying the head of said pin and having an aperture therein aligned with the other of said pair of apertures, a bolt passed through said other of said pair of apertures, said aperture in said saw back, and said aperture in said strip, and a nut for said bolt; one of said connecting means including a connecting strap having a portion extending at substantially right angles thereto and forming a finger grip whereby said blade may be pulled into relatively tight abutting relationship with said back prior to tightening of its associated nut.

EARL K. SHOULTZ.